US012611733B2

(12) United States Patent (10) Patent No.: US 12,611,733 B2
Ryu et al. (45) Date of Patent: Apr. 28, 2026

(54) LASER SCRIBING DEVICE

(71) Applicant: QMC. INC., Anyang-si (KR)

(72) Inventors: Beng So Ryu, Incheon (KR); Hark Yong Kim, Seoul (KR); Gwan Yoo Kim, Cheongju-si (KR); Dong Woo Shin, Jincheon-gun (KR); Seong Ho Song, Bucheon-si (KR); Jang Hyun Kim, Seoul (KR)

(73) Assignee: QMC INC., Anyang-si (KR)

( * ) Notice: Subject to any disclaimer, the term of this patent is extended or adjusted under 35 U.S.C. 154(b) by 506 days.

(21) Appl. No.: 18/123,315

(22) Filed: Mar. 19, 2023

(65) Prior Publication Data

US 2023/0226644 A1 Jul. 20, 2023

Related U.S. Application Data

(63) Continuation-in-part of application No. 16/515,614, filed on Jul. 18, 2019, now abandoned, which is a continuation of application No. PCT/KR2018/002082, filed on Feb. 20, 2018.

(30) Foreign Application Priority Data

Feb. 20, 2017 (KR) ........................ 10-2017-0022268

(51) Int. Cl.
B23K 26/364 (2014.01)
B23K 26/064 (2014.01)
B23K 26/067 (2006.01)

(52) U.S. Cl.
CPC ........ B23K 26/364 (2015.10); B23K 26/0648 (2013.01); B23K 26/067 (2013.01)

(58) Field of Classification Search
CPC .... B23K 26/50; B23K 26/062; B23K 26/364; B23K 26/0648; B23K 26/067
See application file for complete search history.

(56) References Cited

U.S. PATENT DOCUMENTS

| | | | | |
|---|---|---|---|---|
| 2004/0129685 A1* | 7/2004 | Arai | ..................... | B23K 26/382 |
| | | | | 219/121.77 |
| 2005/0205536 A1* | 9/2005 | Norikane | ........... | B23K 26/0604 |
| | | | | 219/121.73 |
| 2012/0199565 A1* | 8/2012 | Nomaru | ................. | B23K 26/40 |
| | | | | 219/121.67 |

(Continued)

FOREIGN PATENT DOCUMENTS

| | | | | | |
|---|---|---|---|---|---|
| JP | 2014028388 A | * | 2/2014 | ............. | B23K 26/20 |
| KR | 20110062884 A | * | 6/2011 | ............. | B23K 26/50 |
| WO | WO-2018151581 A1 | * | 8/2018 | ........... | B23K 26/067 |

*Primary Examiner* — Benjamin P Lee
(74) *Attorney, Agent, or Firm* — Jongkook Park

(57) ABSTRACT

The present invention discloses a laser scribing device that produces optimal scribing lines within a target substrate based on its thickness. This is accomplished by generating multiple or an optimum number of focal points, and dynamically adjusting the focal lengths of the focal points to create optimal distances between the scribing lines. The resulting scribing lines are efficient in breaking the target substrate. The position of the focal points and the distance between them are determined based on the thickness of the target substrate, and the distance between focal points or scribing lines can be dynamically adjusted by modifying the focal lengths of the focal points.

8 Claims, 6 Drawing Sheets

(56) References Cited

U.S. PATENT DOCUMENTS

2012/0261453 A1 * 10/2012 Kajikawa ........... B23K 26/0652
225/1
2019/0351511 A1 * 11/2019 Ryu ..................... B23K 26/064

* cited by examiner

LASER SCRIBING DEVICE

CROSS-REFERENCE TO RELATED APPLICATIONS

The present application is a continuation in part of U.S. patent application Ser. No. 16/525,614, entitled "Laser Scribing Device," filed on Jul. 30, 2019, which claims priority under 35 U.S.C. § 119 to Korean Patent Application No. 10-2017-0022268, filed on Feb. 20, 2017, in the Korean Intellectual Property Office, the disclosure, all of which are incorporated herein by reference in its entirety.

BACKGROUND

Due to their low power consumption, high durability, high brightness, fast response time, and environmentally friendly characteristics, LEDs (Light Emitting Diodes) are widely used in electronic components such as switches for mobile phones and BLUs (Back Light Units) for LED TVs. As the application range expands to the lighting industry, the annual usage of LEDs is increasing.

The LED manufacturing process is divided into four main processes: the EPI process for growing InGaN (Indium Gallium Nitride), chip production, packaging, and module assembly. In addition, scribing is an important process in chip production that determines the characteristics and production yield of chips based on the processing method used to cut the chips.

In particular, defects such as IR (Reverse current), double chips, meandering, and chipping that occur during scribing can lower the production yield of LED chips and make it difficult to optimize and quantify the manufacturing process.

In the past, diamond tip cutting was commonly used for scribing, but many LED manufacturers are increasingly turning to laser scribing equipment due to major issues such as chip surface defects, decreased productivity, and high processing costs.

Laser scribing is a process of cutting or creating scribe lines on a wafer or substrate at each chip level, and it is used in the LED industry that utilizes high-strength sapphire wafers and the packaging industry that utilizes ceramic substrates.

In relation to this, Korean Patent Laid-Open Publication No. 10-2004-0100042 (Title: Device for Laser Scribing) discloses a device consisting of a table on which the laser processing target is placed; a laser oscillator that emits a laser beam onto the processing target on the table; a focusing lens installed on the upper part of the table to direct the laser beam onto the processing target; and a beam delivery device that connects the laser oscillator and the focusing lens to transmit the laser beam to the head. However, such conventional scribing devices have a limitation in processing thick processing targets.

SUMMARY

The present invention aims to provide a laser scribing device that solves the problems of the conventional technology mentioned above, by irradiating two laser beams with different focal points inside a processing target, which differ in thickness direction.

However, the technical challenges that the present embodiments intend to achieve are not limited to the aforementioned technical challenges, and there may be other technical challenges solved by the present invention as well.

The present disclosure relates to a laser scribing device comprising: a laser for emitting a laser beam; a beam splitter for dividing the laser beam into a plurality of laser beams; a beam expander telescope for modifying a divergence angle on one or more paths of the plurality of laser beams, wherein the beam expander telescope comprising one or more optical components, and wherein the divergence angle is modified by adjusting a position of at least one of the optical components; a beam combiner for combining the plurality of laser beams; and a focusing lens to create a plurality of focal points inside a target substrate from the plurality of laser beams, wherein each focal point of the plurality of focal points having different focal lengths, wherein one or more of the focal lengths are adjusted by one or more of the beam expander telescope by modifying the divergence angle of the one or more paths of the plurality of laser beams, and wherein a plurality of scribing lines is simultaneously generated from each focal point of the plurality of focal points by translating the target substrate.

DETAILED DESCRIPTION OF THE INVENTION

Hereinafter, embodiments of the present invention will be described in detail so that those skilled in the art to which the present invention pertains can easily implement them with general knowledge in the art, with reference to the attached drawings. However, the present invention can be implemented in various different forms and is not limited to the embodiments described herein. In addition, unrelated parts have been omitted from the drawings in order to clearly describe the present invention, and similar drawing symbols have been assigned to similar parts throughout the entire specification.

Throughout the entire specification and all the figures:
(i) the symbol "◆" indicates an S-polarized light perpendicular (or vertical) to the optical axis,
(ii) the symbol ":" indicates a P-polarized light parallel (or horizontal) to the optical axis, and
(iii) the symbol "⊙" indicates a circular polarization to the optical axis.

The following describes the laser scribing device 10, having multi focal points with variable focal lengths, of the present invention.

Figure 1A:
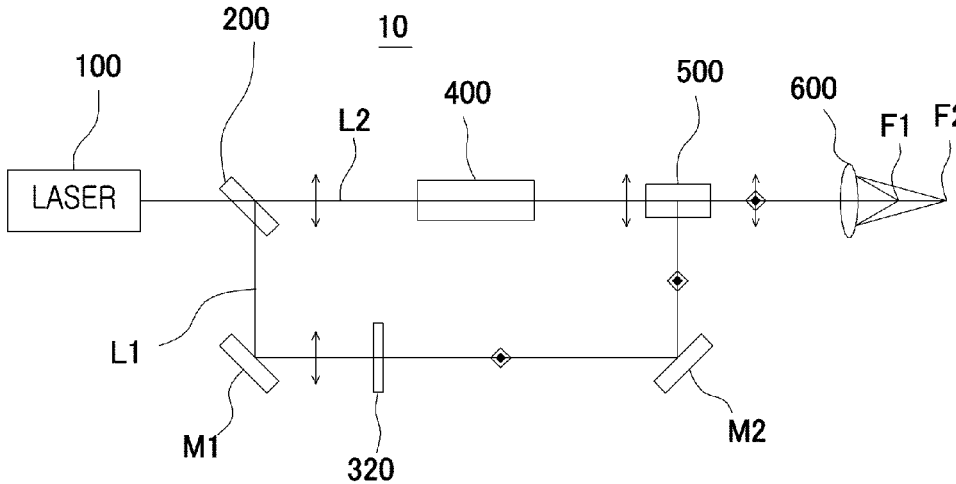
FIGS. 1A, 1B and 1C show a laser scribing device according to a first embodiment of the present disclosure.
Figure 1B:
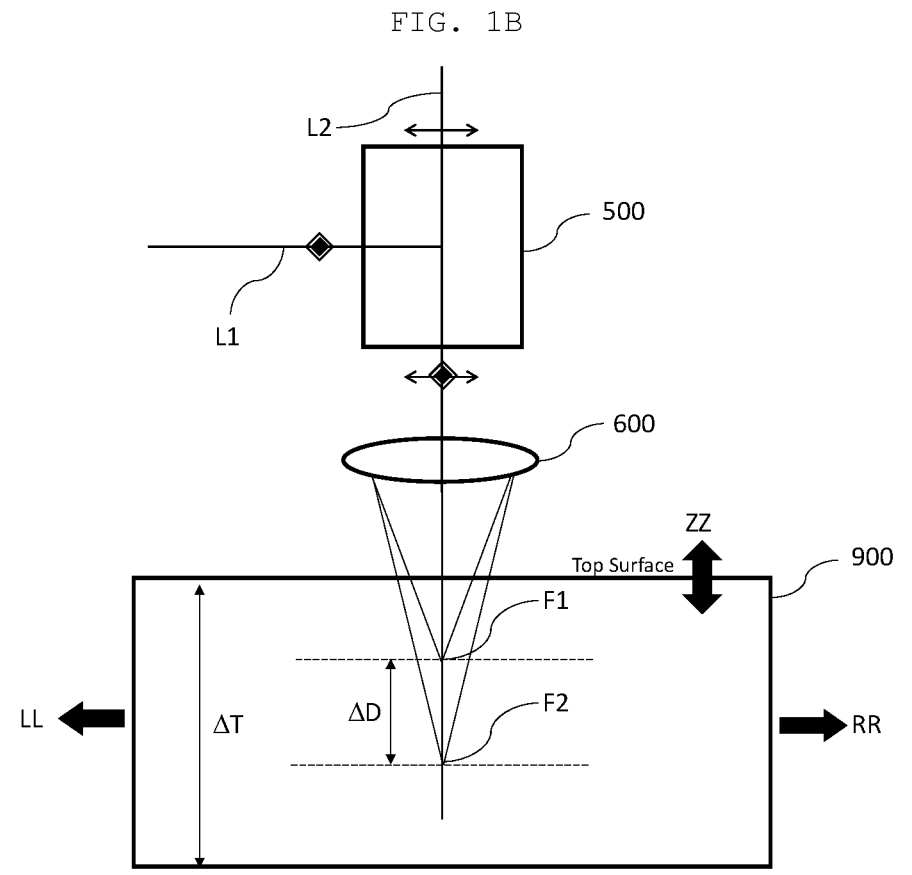
Figure 1C:
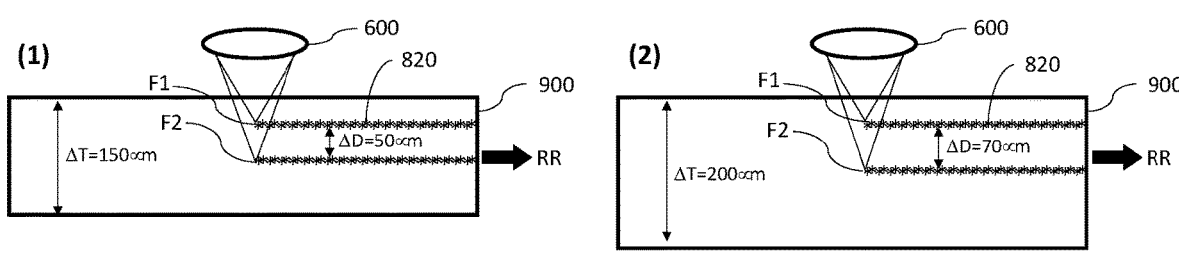
Figure 1C:
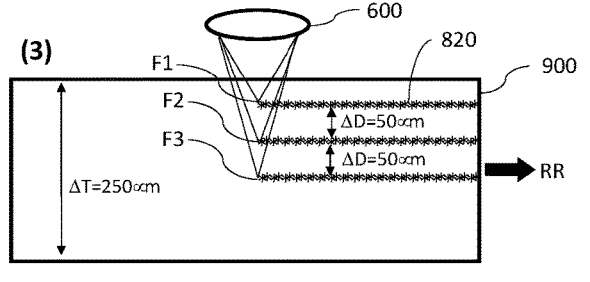
Figure 1C:
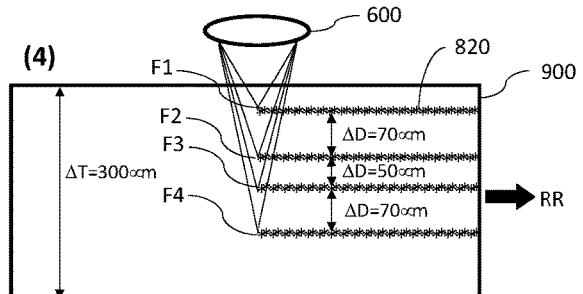

FIGS. 1A to 1C are for the first embodiment. Referring to FIG. 1A, the laser scribing device 10 includes a laser 100 that emits a laser beam, a beam splitter 200 that divides the laser beam into a first laser beam L1 and a second laser beam L2, a first wave plate 320 that rotates the polarization direction of the first laser beam L1 by 90 degrees, a beam expander telescope 400 that adjusts the divergence angle of the second laser beam L2, a first mirror M1 and a second mirror M2 that change the optical path of the first laser beam L1, a beam combiner 500 that combines the first laser beam L1 and the second laser beam L2, a focusing lens 600 that focuses the combined first laser beam L1 and second laser beam L2 to create a first focal point F1 and a second focal point F2, respectively. The laser scribing device 10 may include other mirror components than the first mirror M1 and the second mirror M2 to change the optical paths of the laser beams further. This may contribute to packaging design of the laser scribing device 10 having compact and efficient laser beam paths with the relevant components.

The laser beam emitted from the laser 100 may be (i) in a single wavelength or multiple wavelengths, (ii) in a certain polarization, and (iii) in a small divergence angle of less than several milliradian (mrad). The first laser beam L1 and the second laser beam L2 immediately after the beam splitter 200 have the same wavelength, which may be unchanged at the first focal point F1 and the second focal point F2. The first laser beam L1 and the second laser beam L2 immediately after the beam splitter 200 may have the same polarization as the laser beam immediately emitted from the laser 100. The first laser beam L1 and the second laser beam L2 immediately after the beam splitter 200 may be in a horizontal polarization state (P-polarization). Subsequently, the P-polarized of the first laser beam L1 can be rotated by 90 degrees to become a vertical polarization (S-polarization) by passing through the first wave plate 320. The S-polarization of the first laser beam L1 can be maintained at the first focal point F1, while the P-polarization of the second laser beam L2 can be maintained at the second focal point F2.

In addition, a divergence angle of the first laser beam L1 maintains a characteristic value of the laser 100 (i.e., in a small mrad), while a divergence angle of the second laser beam L2 can be changed by an optical configuration of the beam expander telescope 400. For example, the divergence angle of the second laser beam L2 emitted through the beam expander telescope 400 can be configured to become larger than that of the first laser beam L1. Subsequently, because of the larger divergence angle of the second laser beam L2, a focal length of the second focal point F2 becomes longer than that of the first focal point F1, wherein the first focal point F1 (from the first laser beam L1 having only a small divergence angle inherited from the laser 100) has the focal length close to a nominal focal length of the focusing lens 600.

Note that:

the "focal length" is a distance between a focusing lens and a focal point, and the "nominal focal length" is a focal length with an incident laser beam having perfectly parallel light or 0 mrad divergence angle.

Conversely, if a divergence angle of the second laser beam L2 becomes smaller, being close to parallel light or 0 mrad divergence angle, the second focal point F2 moves closer to the first focal point F1 or the nominal focal length of the focusing lens 600, and conversely further, if the divergence angle of the second laser beam L2 after the beam expander telescope 400 is negative (i.e., the second laser beam L2 is now converging) the focal length of the second focal point F2 becomes shorter than the first focal point F1. To clarify the description in this invention, it is important to note that the term "divergence angle" is used to refer to both converging and diverging angles of a laser beam.

The beam expander telescope 400 may include one or more optical components to adjust an incident angle of a laser beam. For example, a single convex lens or a single concave lens as well as multiple lenses in combination can comprise the one or more components of the beam expander telescope 400. By adjusting a position of at least one optical component of the beam expander telescope 400, the angle of an incident laser beam to the focusing lens 600, such as the second laser beam L2, can be changed (either to a converging angle or a diverging angle), thereby changing the focal length of the focal point F2 accordingly. The positions of optical components of the beam expander telescope 400 can be automatically adjusted by a motor drive, allowing dynamic adjustments of focal lengths of a laser beam focused by a focusing lens.

Referring to FIG. 1B, a magnified and rotated view of the configuration around the focusing lens 600 in FIG. 1A with a target substrate 900, the S-polarized first laser beam L1 and P-polarized second laser beam L2 are simultaneously and coaxially emitted from the beam combiner 500. The S-polarized first laser beam L1 is focused at the first focal point F1 and the P-polarized second laser beam L2 can be focused at the second focal point F2 by the focusing lens 600.

The initial working distance (i.e., the distance between the focusing lens 600 and the top surface of the target substrate 900) can be set by translating the target substrate 900 in the ZZ direction. This is necessary to ensure that both the first focal point F1 and the second focal point F2 are positioned inside the target substrate 900. The focused laser beams at the focal points F1 and F2 can produce internal cracks in the target substrate 900. These cracks can generate scribing lines by translating the target substrate 900 in a certain lateral direction, such as the directions RR or LL. To generate scribing lines that are sufficient to break the target substrate 900, the positions of the focal points F1 and F2 and the distance between them (ΔD) are determined based on the thickness (ΔT) of the target substrate 900. The defining feature of the present invention is its capability to dynamically adjust ΔD by modifying the focal lengths of focal points F1 and/or F2.

Referring to the FIG. 1C, which illustrates dynamic adjustments of ΔD as well as optimum numbers of the focal points based on the ΔT of target substrate 900.

in the subfigure (1), when the thickness of the target substrate 900 is ΔT=150 μm, the double scribing lines 820 created by the focal points F1 and F2, and formed by translating the target substrate in the RR direction with the ΔD of 50 μm, are adequate to break the target substrate 900;

in the subfigure (2), when the thickness of the target substrate 900 is ΔT=200 μm, the double scribing lines 820 are still effective to break the target substrate 900, however the ΔD is needed to be increased to 70 μm;

in the subfigure (3), when the thickness of the target substrate 900 is ΔT=250 μm, the double scribing lines 820 are no longer capable of breaking the target substrate 900. To overcome this, the third scribing line formed by the third focal point F3 is introduced to break the substrate, while maintaining the ΔD among all three scribing lines at 50 μm; and in the subfigure (4), when the thickness of the target substrate 900 increases to ΔT=300 μm, a fourth scribing line formed by the focal point T4 is necessary to break the target substrate 900. The ΔDs are dynami-cally arranged to be either 50 μm or 70 μm.

The third focal point F3 in the subfigure (3) can be created by splitting the output laser beam from laser 100 into three beams using the beam splitter 200. These beams are then combined by the beam combiner 500 to emit the laser beams simultaneously and coaxially onto the target substrate, thus creating the focal points F1, F2, and F3.

The third and forth focal points F3 and F4 may be created by splitting the output laser beam from laser 100 into four beams using one or more beam splitter 200. These beams are then combined by one or more the beam combiner 500 to irradiate the laser beams simultaneously and coaxially onto the target substrate, thus creating the focal points F1, F2, F3 and F4. Alternatively, the laser scribing device 10 with dual focal points, as illustrated in FIG. 1A, can be used to process the target substrate 900 twice by dynamically adjusting the focal lengths on each pass. During the first pass, the scribing lines with focal lengths at F1 and F2 are created, while during the second pass, scribing lines with focal lengths at F3 and F4 are produced.

One of the distinctive features of the present invention is its capacity to produce the required scribing lines based on the thickness (ΔT) of the target substrate. This is achieved by generating multiple focal points or optimum number of focal points, wherein the focal lengths of each point are dynami-cally adjusted to create optimal distances (ΔDs) between the scribing lines.

Figure 2:
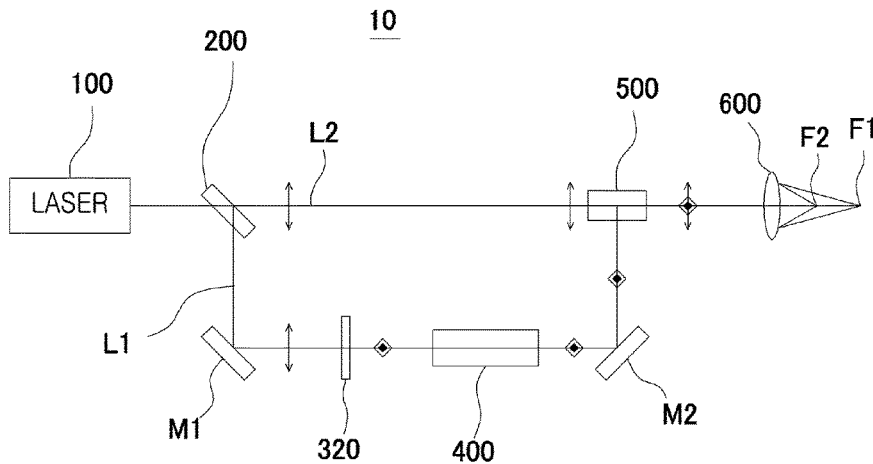
FIG. 2 shows a laser scribing device according to a second embodiment of the present disclosure.

Referring to FIG. 2 for the second embodiment, the beam expander telescope 400 is now positioned on the path of the first laser beam L1. This beam is adjusted by the telescope 400 to have a specific divergence angle larger than that of the second laser beam L2. Similar to the first embodiment, the focal length of the first focal point F1, focused by the focusing lens 600, may be longer than that of the second focal point F2.

Figure 3:
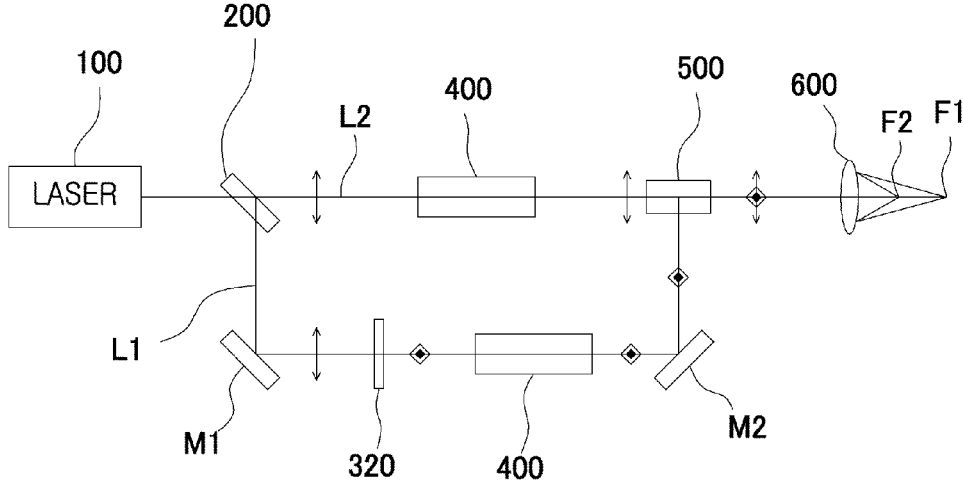
FIG. 3 shows a laser scribing device according to a third embodiment of the present disclosure.

Referring to FIG. 3 for the third embodiment, the beam expander telescope 400 can be positioned on both the path of the first laser beam L1 and the path of the second laser beam L2. Similar to the first and second embodiments, this arrangement enables dynamic adjustments of the focal lengths in both focal points F1 and F2.

Figure 4:
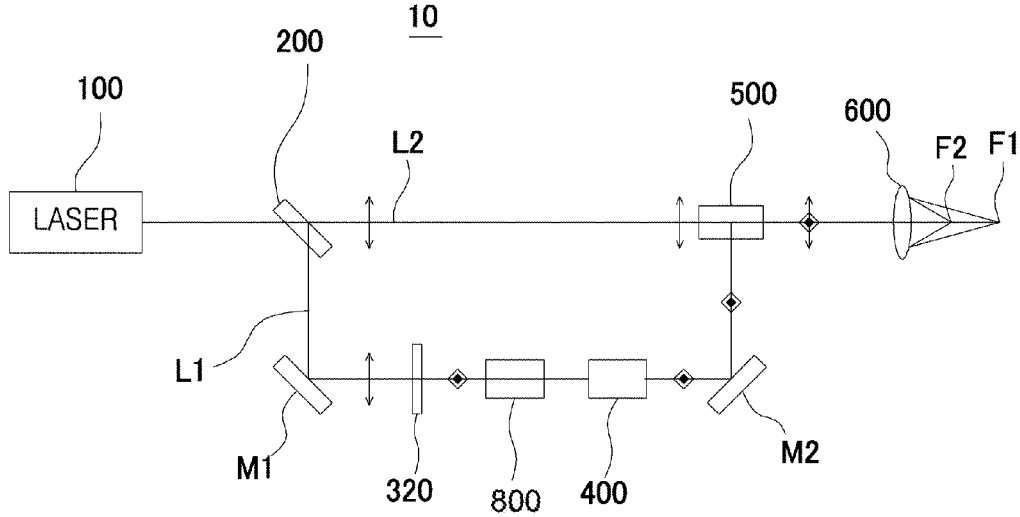
FIG. 4 shows a laser scribing device according to a fourth embodiment of the present disclosure.

Referring to FIG. 4 for the fourth embodiment of the present invention, the laser scribing device 10 may include a polarization beam splitter 800 that controls the energy of the first laser beam L1 after passing through the first wave plate 320. The energy of the first laser beam L1 can be adjusted based on the setting state of the polarization beam splitter 800. For instance, when the angle of the first wave plate 320 is rotated by 10 degrees, the first laser beam L1 passing through the first wave plate 320 is outputted as a combination of 90% vertically polarized laser beam and 10% horizontally polarized laser beam. The polarization beam splitter 800 allows only the vertically polarized laser beam to pass through, resulting in the energy of the first laser beam L1 having 90% energy only from the vertically polarized laser beam.

Figure 5:
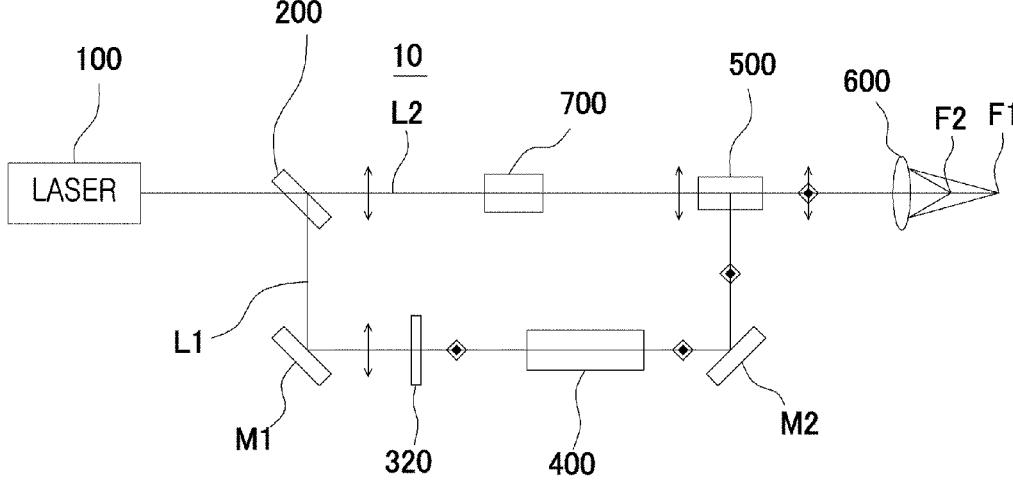
FIG. 5 shows a laser scribing device according to a fifth embodiment of the present disclosure.

Referring to FIG. 5 for the fifth embodiment of the present invention, the laser scribing device 10 can be equipped with an attenuator 700 that regulates the energy of the second laser beam L2. This attenuator may be comprised of a neutral density filter which can reduce the intensity of a laser beam by absorbing a portion of its energy. This attenuator 700 may also contain components such as a wave plate and a polarization beam splitter, similar to the wave plate 320 and polarization beam splitter 800 in the fourth embodiment. Using the same principle as described in the fourth embodiment, the energy of the second laser beam L2 can be adjusted based on the polarization angle of the wave plate and the setting state of the polarization beam splitter inside the attenuator 700.

Figure 6:
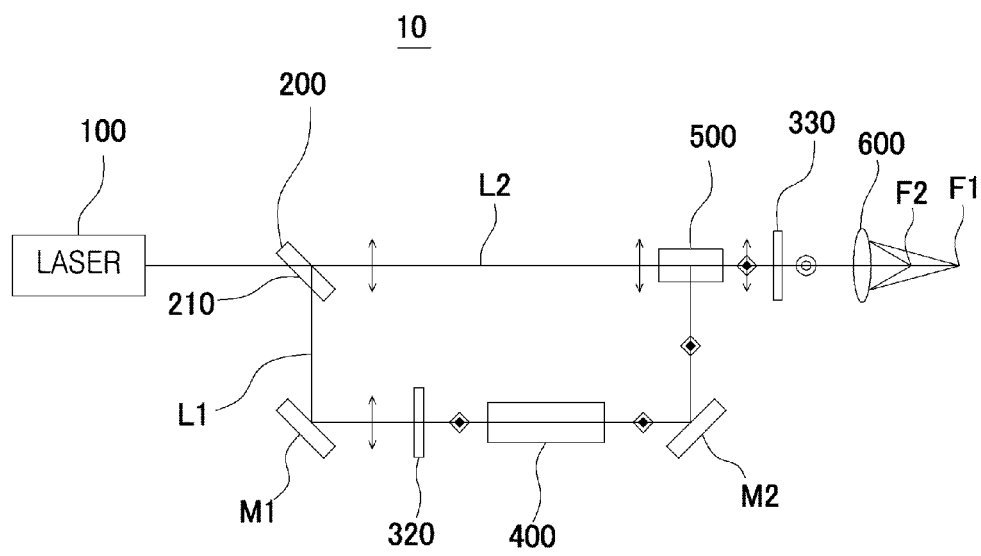
FIG. 6 shows a laser scribing device according to a sixth embodiment of the present disclosure.

Referring to FIG. 6 for the sixth embodiment of the present invention, a laser scribing device 10 may feature a second waveplate 330, which can be coupled to an output terminal of the beam combiner 500 or installed anywhere between the beam combiner 500 and the focusing lens 600. The second waveplate 330 can convert the polarization states of the first laser beam L1 and the second laser beam L2 (both coaxially outputted from the beam combiner 500) to circular polarization. For instance, the second waveplate 330 can be a quarter-wave plate that converts different linear polarizations of the first and second laser beams L1 and L2 into the same circular polarization.

Figure 7:
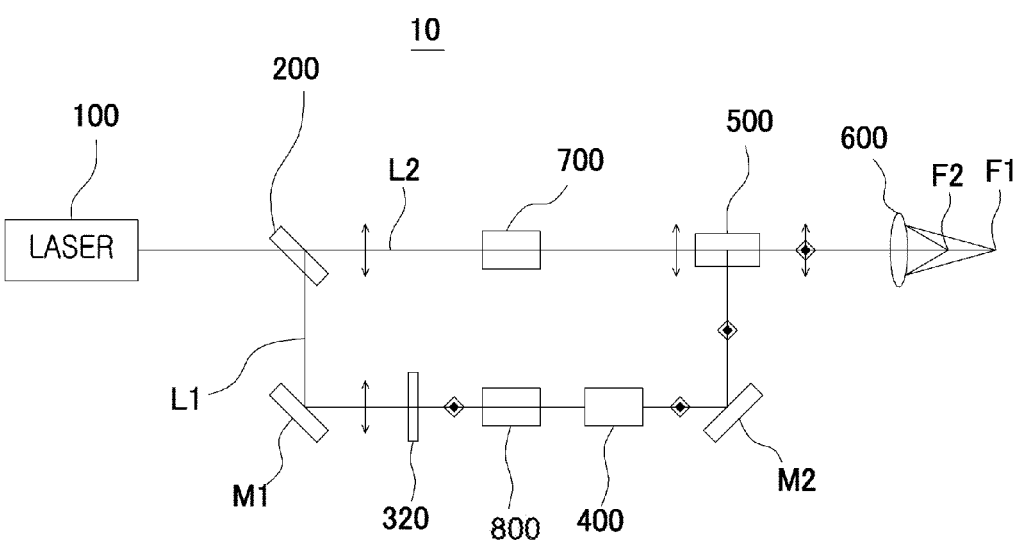
FIG. 7 shows a laser scribing device according to a seventh embodiment of the present disclosure.

Referring to FIG. 7, the seventh embodiment of the present invention, a polarization beam splitter 800 can be positioned after the first wave plate 320 on the path of the first laser beam L1, allowing for control of the energy of the first laser beam L1. Similarly, an attenuator 700 can be installed after the splitter 200 on the path of the second laser beam L2, enabling control of the energy of the second laser beam L2. In other words, the energy of both the first laser beam L1 and the second laser beam L2 can be regulated respectively using the polarization beam splitter 800 and the attenuator 700.

Figure 8:
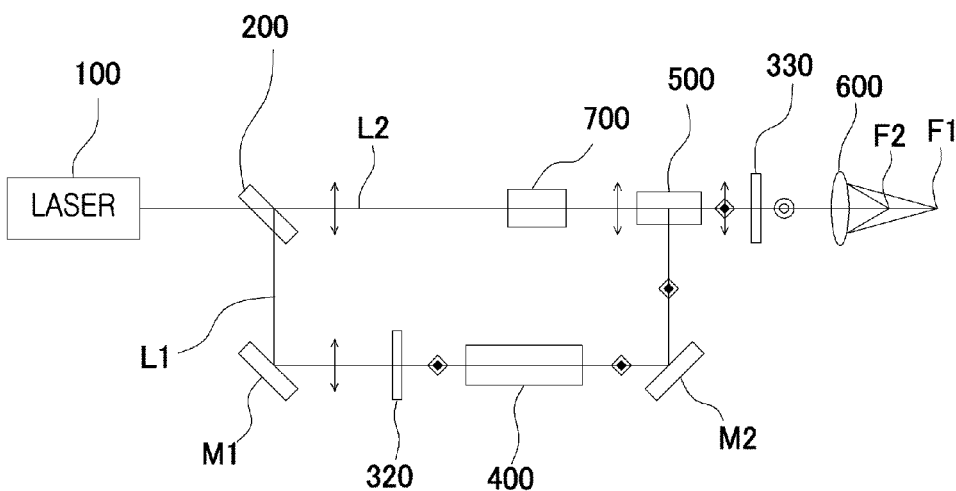
FIG. 8 shows a laser scribing device according to an eighth embodiment of the present disclosure.

Referring to FIG. 8, the eighth embodiment of the present invention, a quarter wave plate 330 can be added to the laser scribing device 10 described in the fifth embodiment. The quarter wave plate 330 is placed after the beam combiner 500 on the path of both laser beams L1 and L2. As stated in the sixth embodiment, the second waveplate 330 can be a quarter-wave plate that transforms the different linear polar-izations of the first and second laser beams L1 and L2 into the same circular polarization. All other components shown in this FIG. 8 perform the same functions as described in the fifth or other previous embodiments.

Figure 9:
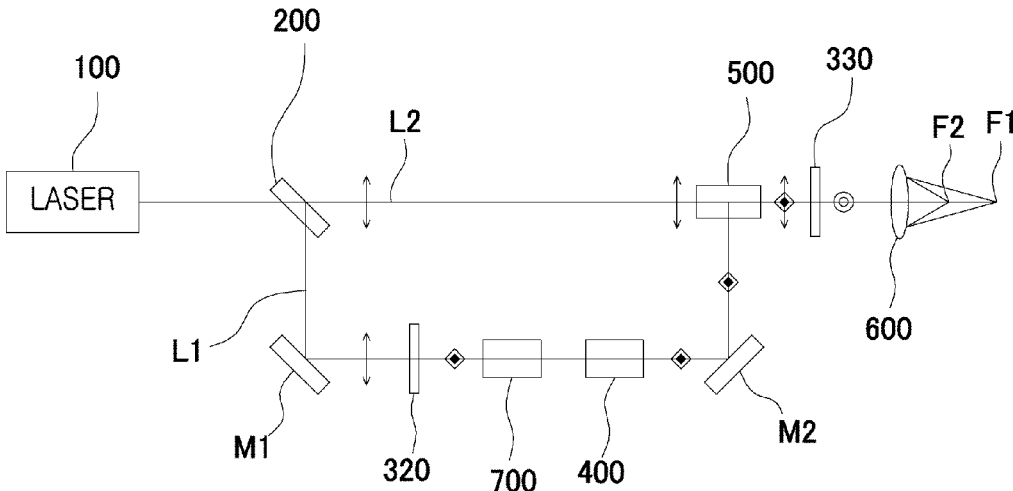
FIG. 9 shows a laser scribing device according to a ninth embodiment of the present disclosure.

Referring to FIG. 9, the ninth embodiment of the present invention, the second wave plate 330, which is a quarter wave plate, can be installed after the beam combiner 500 on the path of the laser beams L1 and L2, while the attenuator 700 is installed after the first wave plate 320 on the path of the first laser beam L1. The second wave plate 330 and the attenuator 700 perform the same functions as described in the sixth and fifth embodiments respectively as well as in the previous embodiments.

Figure 10:
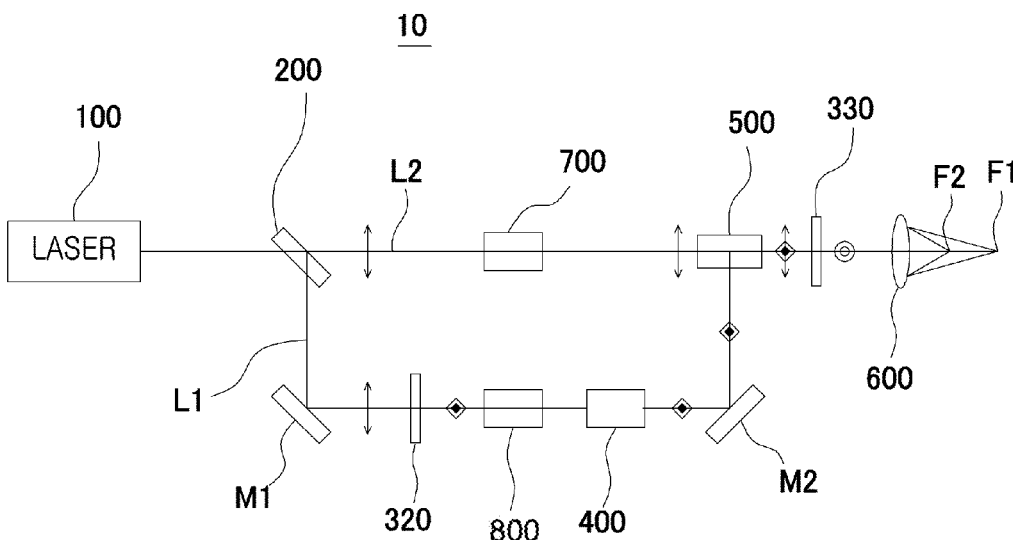
FIG. 10 shows a laser scribing device according to a tenth embodiment of the present disclosure.

Referring to FIG. 10 for the tenth embodiment of the present invention, the second wave plate 330 which is a quarter wave plate, can be included in the laser scribing device 10 described in the seventh embodiment. The quarter wave plate 330 is placed after the beam combiner 500 on the path of both laser beams L1 and L2. As stated in the sixth embodiment, the second waveplate 330 can be a quarter-wave plate that transforms the different linear polarizations of the first and second laser beams L1 and L2 into the same circular polarization. All other components shown in this FIG. 10 perform the same functions as described in the seventh or other previous embodiments.

The laser scribing device 10 in the embodiments pre-sented in this invention can be configured in other ways to achieve the desired outcomes, and this can be achieved by splitting the outputting laser beam from the laser 100 into three or more multiple laser beams and by incorporating one or more or in combination thereof of the following compo-nents, including but not limited to: the mirror M, the beam splitter 200, the first waveplate 320, and the second waveplate 330, the beam expander telescope 400, the beam combiner 500, the attenuator 700, the polarization beam splitter 800.

Depending on the specific application, these components can be added or removed from the device to achieve the desired results. By incorporating these components into the device, the laser scribing device 10 can generate dynamically adjusted scribing lines on a variety of target substrates in a wide range of thicknesses. Whether used individually or in combination, these components provide the flexibility and versatility needed to produce high-quality scribing lines with maximum precision and efficiency for breaking the target substrates.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention, which is limited only by the claims which follow.

What is claimed is:

1. A laser scribing device comprising:
a laser for emitting a laser beam;
a beam splitter for dividing the laser beam into a plurality of laser beams;
a beam expander telescope for modifying a divergence angle of one or more of the laser beams,
   wherein the beam expander telescope comprising one or more optical components, and
   wherein the divergence angle is modified by adjusting a position of at least one of the optical components;
a beam combiner for combining the plurality of laser beams and emitting coaxially the plurality of laser beams; and
a focusing lens to create a plurality of focal points inside a target substrate from the plurality of laser beams,
   wherein each focal point of the plurality of focal points having different focal lengths,
   wherein each of the focal lengths is a distance between the focusing lens and a focal point,
   wherein one or more of the focal lengths are adjusted by the beam expander telescope by modifying the divergence angle of one or more of the laser beams, and
   wherein a plurality of scribing lines is simultaneously generated from each focal point of the plurality of focal points by translating the target substrate.

2. The laser scribing device of claim 1, further comprising:

an attenuator positioned on one or more paths of the plurality of laser beams to control energy of one or more of the laser beams.

3. The laser scribing device of claim 1 or 2, further comprising:
a first wave plate positioned on one or more paths of the plurality of laser beams to control a polarization state of one or more of the laser beams.

4. The laser scribing device of claim 3, further comprising:
a second wave plate coupled to an output terminal of the beam combiner to convert the polarization state of the plurality of laser beams to a circular polarization state.

5. A laser scribing device comprising:
a laser for emitting a laser beam;
a beam splitter for dividing the laser beam into a first laser beam and a second laser beam;
a beam expander telescope for modifying a divergence angle of at least one of the first and the second laser beams,
   wherein the beam expander telescope comprising one or more optical components, and
   wherein the divergence angle is modified by adjusting a position of at least one of the optical components;
a beam combiner for combining the first laser beam and the second laser beam and emitting coaxially the first laser beam and the second laser beam; and
a focusing lens to create a first focal point for the first laser beam and a second focal point for the second laser beam inside a target substrate;
   wherein the first focal point and the second focal point have different focal lengths,
   wherein a first focal length of the first focal point is a distance between the focusing lens and the first focal point,
   wherein a second focal length of the second focal point is a distance between the focusing lens and the second focal point,
   wherein at least one of the first and the second focal lengths is adjusted by the beam expander telescope by modifying the divergence angle of at least one of the first and second laser beams, and
   wherein a first scribing line and a second scribing line are simultaneously generated by each focal point of the first focal point and the second focal point respectively by translating the target substrate.

6. The laser scribing device of claim 5, further comprising:
an attenuator positioned on at least one paths of the first and the second laser beams to control energy of at least one of the first and the second laser beams.

7. The laser scribing device of claim 5 or 6, further comprising:
a first wave plate positioned on at least one paths of the first and the second laser beams to control a polarization state of at least one of the first and the second laser beams.

8. The laser scribing device of claim 7, further comprising:
a second wave plate coupled to an output terminal of the beam combiner to convert the polarization state of the first and the second laser beams to a circular polarization state.

* * * * *